(12) United States Patent
Sarwary et al.

(10) Patent No.: US 10,599,800 B2
(45) Date of Patent: Mar. 24, 2020

(54) FORMAL CLOCK NETWORK ANALYSIS, VISUALIZATION, VERIFICATION AND GENERATION

(71) Applicant: Synopsys, Inc., Mountain View, CA (US)

(72) Inventors: Mohamed Shaker Sarwary, San Diego, CA (US); Hans-Joerg Peter, Munich (DE); Guillaume Plassan, Mérignac (FR); Barsneya Chakrabarti, Uttar Pradesh (IN); Mohammad Homayoun Movahed-Ezazi, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/047,976

(22) Filed: Jul. 27, 2018

(65) Prior Publication Data

US 2019/0034571 A1    Jan. 31, 2019

(30) Foreign Application Priority Data

Jul. 27, 2017  (IN) .............................. 201741026782

(51) Int. Cl.
*G06F 17/50*      (2006.01)
(52) U.S. Cl.
CPC ...... *G06F 17/5045* (2013.01); *G06F 2217/62* (2013.01); *G06F 2217/84* (2013.01)

(58) Field of Classification Search
CPC .................................................. G06F 17/5045
USPC .......................................................... 716/102
See application file for complete search history.

(56) References Cited

U.S. PATENT DOCUMENTS

| | | | |
|---|---|---|---|
| 6,591,402 B1* | 7/2003 | Chandra ............. | G06F 17/5022 716/106 |
| 9,934,342 B1* | 4/2018 | Huang .................. | G06F 17/504 |
| 10,366,187 B2* | 7/2019 | Darbari ............... | G06F 17/5031 |
| 2012/0209583 A1* | 8/2012 | Parizy ................. | G06F 17/5022 703/14 |
| 2015/0278416 A1* | 10/2015 | Darbari ............ | G01R 31/31727 716/108 |
| 2016/0314223 A1* | 10/2016 | Darbari ............... | G06F 17/5022 |
| 2017/0177753 A9* | 6/2017 | Darbari ............... | G06F 11/3608 |
| 2018/0082004 A1* | 3/2018 | Liu ..................... | G06F 17/5031 |

\* cited by examiner

*Primary Examiner* — Suresh Memula
(74) *Attorney, Agent, or Firm* — Fenwick & West LLP

(57) ABSTRACT

Formal verification techniques are used to extract valid clock modes from a hardware description of the clock network. In one aspect, the clock network includes primary clocks and configuration signals as inputs, and also includes derived clocks within the clock network. The derived clocks are configurable for different clock modes according to the values of the configuration signals. A parametric liveness property checking is applied to the derived clocks, where the configuration signals are parameters for the parametric liveness property checking. The parametric liveness property checking infers which values of the configuration signals result in valid clock modes for the derived clocks.

20 Claims, 6 Drawing Sheets

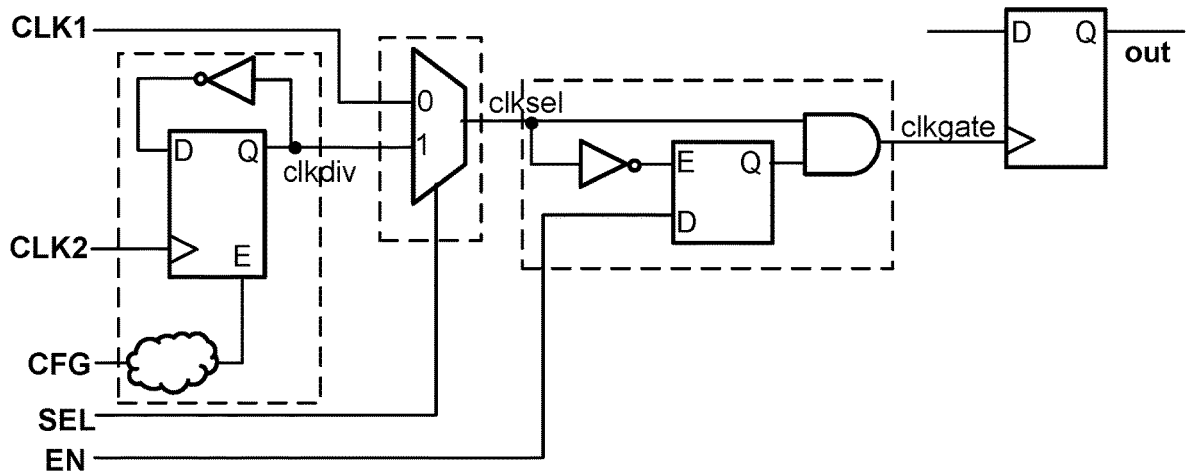
FIG. 4A
| clkgate mode | #1 | #2 | #3 | #4 | #5 |
|---|---|---|---|---|---|
| Source | CLK1 | CLK2 | CLK2 | CLK2 | CLK2 |
| Frequency | – | 1/2 | 1/4 | 1/6 | 1/8 |
| Conf. signals CFG | – | 00 | 01 | 10 | 11 |
| Conf. signals SEL | 0 | 1 | 1 | 1 | 1 |
| Conf. signals EN | 1 | 1 | 1 | 1 | 1 |
FIG. 4B
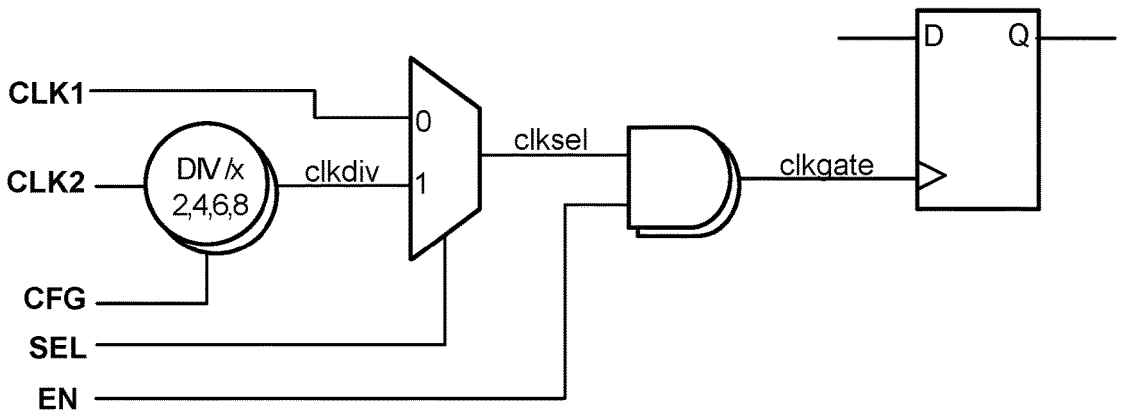
FIG. 4C

US 10,599,800 B2

FORMAL CLOCK NETWORK ANALYSIS, VISUALIZATION, VERIFICATION AND GENERATION

CROSS-REFERENCE TO RELATED APPLICATION(S)

This application claims priority to Indian Provisional Patent Application Serial No. 201741026782, "Formal Clock Network Analysis, Visualization, Verification and Generation," filed Jul. 27, 2017. The subject matter of all of the foregoing is incorporated herein by reference in their entirety.

BACKGROUND

1. Technical Field

This disclosure relates to clock networks in integrated circuits.

2. Description of Related Art

Clocks are an important part of integrated circuits. Today's complex designs may involve hundreds of clocks interconnected in a complex network responsible for pacing computation in an integrated circuit. Design architects, designers, verification engineers, and chip integrators spend tremendous time and effort to specify, develop, and verify the correct implementation of clock networks. A clock network may include well-defined functional modules, which are converted to a complex, detailed but hard to understand circuit once it is described in a hardware language and implemented. The complexity of the circuit may make it difficult to understand, describe, implement, verify and debug issues relating to clocks and clock networks.

Designers describe their design intent in a hardware description language which is then verified and transformed into transistors that can be implemented on silicon. In addition, designers and verification engineers are expected to define clocks and clock relationships that are coded in a design, but that verification and implementation tools cannot infer and that may represent a design environment not captured by the design description.

In addition, in today's hardware design ecosystem, chips are often built by integrating existing circuit designs, commonly known as intellectual properties, IPs, IP blocks, or IP cores (not to be confused with the intellectual property rights of a legal nature). Designers may not be familiar with the IP blocks they are using and therefore may be missing important information, including clocks and clock relations.

Finally, the process of understanding and creating clocks and clock relations is often a manual and therefore error-prone process. Tools that are available to designers today may provide convoluted or incomplete information.

Thus, there is a need for better approaches to analyze, visualize, extract, verify and generate clocks and clock relations to assist designers.

SUMMARY

The present disclosure overcomes the limitations of the prior art by using formal verification techniques to extract valid clock modes from a hardware description of a clock network. In one aspect, the clock network includes primary clocks and configuration signals as inputs, and also includes derived clocks within the clock network. The derived clocks are configurable for different clock modes according to the values of the configuration signals. A parametric liveness property checking is applied to the derived clocks, where the configuration signals are parameters for the parametric liveness property checking. The parametric liveness property checking infers which values of the configuration signals result in valid clock modes for the derived clocks.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 4A is a view of a hardware description of another clock network.

FIG. 4B is a table showing the valid clock modes for derived clock clkgate from FIG. 4A.

FIG. 4C is an abstracted functional view of the clock network of FIG. 4A.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
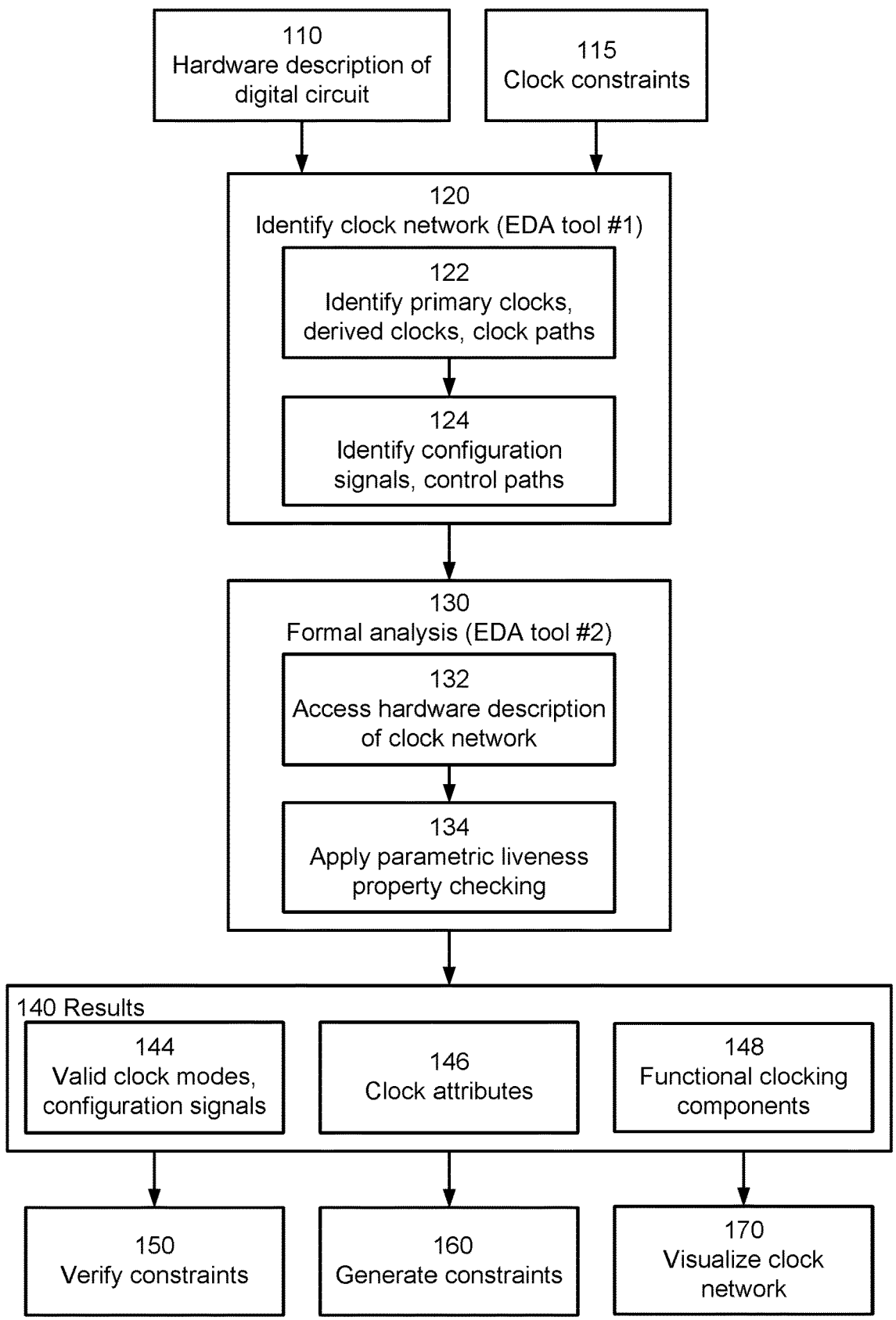
FIG. 1 is a flow diagram for extracting valid clock modes from a hardware description of a digital circuit, according to an embodiment.

FIG. 1 is a flow diagram for extracting valid clock modes from a hardware description of a digital circuit, according to an embodiment. The hardware description 110 typically is an RTL-level description, for example written in a hardware description language (HDL) such as Verilog or VHDL. However, it may also be a gate-level description. The digital circuit contains a clock network and the clocks and clock relations within the digital circuit may be specified as clock constraints 115, for example using Synopsys Design Constraint (SDC).

An EDA (electronic design automation) tool accesses the hardware description 110 of the digital circuit and identifies 120 the clock network within the digital circuit. This typically is accomplished by a structural design analysis of the digital circuit. In the example of FIG. 1, the EDA tool identifies 122 "primary" clocks, derived clocks and clock paths through the digital circuit. Primary clocks are inputs to the clock network of interest and derived clocks are derivatives within the clock network. In one approach, memory elements in the circuit design are identified, and their clock paths are traced 122 to extract the structure of the clock network. One technique differentiates between direct and indirect clocks. A direct clock is a clock that is the sole clock source for a given memory element, while an indirect clock is a clock source that goes through transformations. Similarly, the presence of multiplexers, clock gating cells (CGCs) and other components as well as naming conventions may be exploited to identify clocks. Information from the clock constraints 115 may also be used.

The structural analysis also identifies 124 candidate control signals (referred to as configuration signals) that might be responsible for configuring a functional block in the clock path, such as a loadable counter or a configurable clock divider. The derived clocks may be configurable for different clock modes according to the values of the configuration signals. The corresponding control paths from these configuration signals to the clock paths are identified 124. While configuration signals are important, this step 124 need not be performed without errors because the subsequent formal analysis 130 will confirm the role of the configuration signals.

The example of FIG. 1 uses two different EDA tools for steps 120 and 130, although this is not required. The second EDA tool performs the formal analysis 130 of the clock network. In formal analysis, the functionality of a design of an integrated circuit is analyzed using formal proofs. The formal environment includes a number of properties and constraints. Known methods are used to prove or disprove the properties, subject to the given constraints, thus indicating whether the circuit design has the correct functionality. In FIG. 1, the EDA tool receives 132 the clock network from the first EDA tool 120. In one approach, the first EDA tool 120 passes some sort of pointer or file name to the second EDA tool 130. The first EDA tool 120 may write data to an output file, which is read in by the second EDA tool 130.

One form of formal analysis is liveness property checking. A counterexample (aka, witness) to a liveness property is always of infinite length (finitely representable, though). In this example, EDA tool #2 applies a parametric liveness property checking to the derived clocks. The configuration signals are parameters for the parametric liveness property checking. They occur in both the models and in the properties. The fact that these are clock networks (which are deterministic once the configuration signals are fixed) is used to get rid of the logical alternation between configuration variables and branch quantifier. This enables the parametric formulation. The parametric liveness property checking infers 134 which values of the configuration signals result in which valid clock modes 144 for the derived clocks.

More specifically, the liveness property can be transformed into a safety property(ies). A counterexample to a safety property is always of finite length. Standard proof engines/model checking algorithms may be used to infer the parameter values. These standard techniques are usually, but not always, based on SAT (satisfiability) principles. As part of this analysis, the following common functional clocking components may be identified:

Clock divider with a fixed dividing factor.
Configurable clock divider. This is a clock divider for which the divide-by factor can be configured by control signals.
Clock multiplier with a fixed multiplication factor.
Configurable clock multiplier. This is a clock multiplier for which the multiply-by factor can be configured by control signals.
Multiplexers. Commonly used to multiplex between two different clock sources.
Glitch-free multiplexers. Functional component comprised of sequential logic and synchronizers which is commonly used to multiplex between two asynchronous clocks.
Clock gating circuits. Commonly used to save power and protect a design against glitch hazards.
Custom circuits that manipulates clock waveforms, such as logic that shifts or delays clock waveforms.

This is not an exhaustive list and other components may be added.

Other information may also be derived. For example, the actual clock attributes 146 for the derived clocks in different valid clock modes may also be determined based on the results of the parametric liveness property checking. Examples of clock attributes include clock division, clock multiplication, clock duty cycle, clock phase, and clock offset (e.g., initialization time before the periodic clock begins).

In one approach, these are determined using predefined monitor automata to encode different types of derived clocks. The technique described above uses parametric liveness property checking. N parameter bits can be used to encode $2^N$ different automata. In multimode clocks, N configuration bits may determine the clock mode. The property checking procedure automatically finds a suitable instantiation of those N bits. This procedure may be made more scalable by applying specific abstractions tailored to clock networks. Specific families of monitor automata encode specific types of derived clock waveforms: divider w/specific factor, any divider, multiplier, shaper, gating, any periodic waveform, etc. We also exploit that fact that clock networks are deterministic once the (static) control values are assumed. The parametric analysis preferably can also identify initialization sequences or offset shifts. Intermediate derived waveforms reveal clock-waveform manipulators such as dividers, multipliers, shapers, etc.

Automata may also be defined hierarchically. For example, we can monitor a derived clock relatively to a primary clock, or (hierarchically) a derived clock relatively to another derived clock. This is a divide-and-conquer approach that simplifies the state space of the formal problem.

Functional clocking components 148 in the clock network may also be determined. Generally, the functional components within a clock network are limited to these four types:
clock selection components—choosing to propagate one clock or another
clock blending components—combining two clocks to generate a new one
clock gating components—propagating or stopping a clock based on certain conditions
clock shaping components—modifying the period, duty cycle, phase or offset of a clock Thus, an abstracted functional view of the clock network may be generated based on the primary clocks, the derived clocks and the functional clocking components, rather than showing all of the detail present in the original hardware description. This simplified view facilitates understanding of the clock network. The functional clocking components may be associated with corresponding components in the hardware description of the clock network. This may be useful when working with the two views, for example.

The outputs 140 from EDA tool #2 may also be used in different ways. They may be used for verification 150. For example, the valid clock modes specified in the clock constraints 115 provided as part of the circuit description may be verified against the actual valid clock modes 144 inferred by the parametric liveness property checking. The specific clock attributes 146 may also be verified.

This can be done so that the constraint of interest is augmented with additional attributes. For example, given a create_generate_clock command in SDC, the software infers and generates the rising edges. Furthermore, if the user has specified edges but the circuit actually implements a shift factor, the software may rectify the user-input clock edges and apply the offset. If the user inputs the constraint as –edges {1 3 5} but the digital circuit applies an offset, the software may flag the discrepancy or automatically change it to –edges {2 4 6}. Similarly, errors in divide-by or multiply-by factors or missing case-analysis can be identified, and the constraints updated to reflect the current design. A clock offset may also be detected and reported, for example if a clock comes active only after 10 cycles (before that, the clock is "dead") due to reset or other controls. Such relation may be identified and clock definitions corrected.

Verification may also proceed in the reverse direction. If the inferred constraints 140 do not match what is specified and the specified constraints are known to be correct, then the digital circuit may have a fault in its design.

If constraints are not specified, they may be automatically generated 160, including supplementing partially specified clock constraints. For example, clock definitions, valid clock modes, clock relations and mode setup information may be generated in a standard constraint format such as SDC.

As a final example, the results 140 of the analysis may be used to show 170 a more compact, functional view of the clock network. Often, the original hardware description 110 contains too much detail that clutters an understanding of the clock network. A more abstracted functional view of the clock network based on just the primary clocks, the derived clocks and the functional clocking components may be more helpful to understanding the clock network.

Figure 2A:
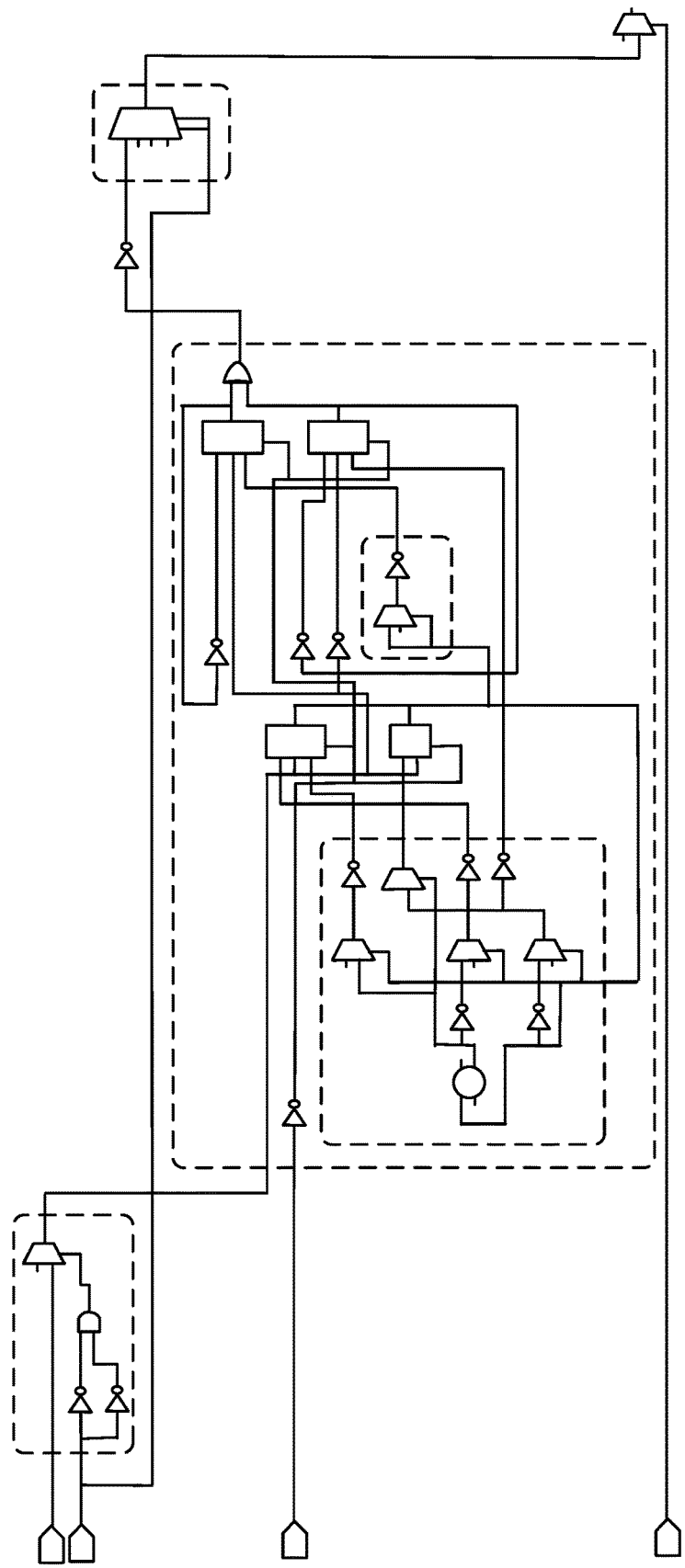
FIG. 2A is a view of a hardware description of a clock network.
Figure 2B:
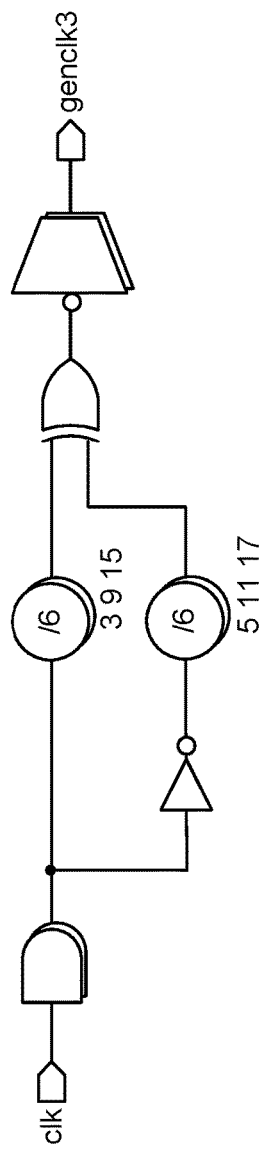
FIG. 2B is an abstracted functional view of the clock network of FIG. 2A.

FIGS. 2A and 2B show one example. FIG. 2A is a view of the original hardware description 110, and FIG. 2B is the corresponding abstracted functional view. The software may add associations between corresponding components in the two views, to allow cross-probing or other design and debug functions.

Figure 3A:
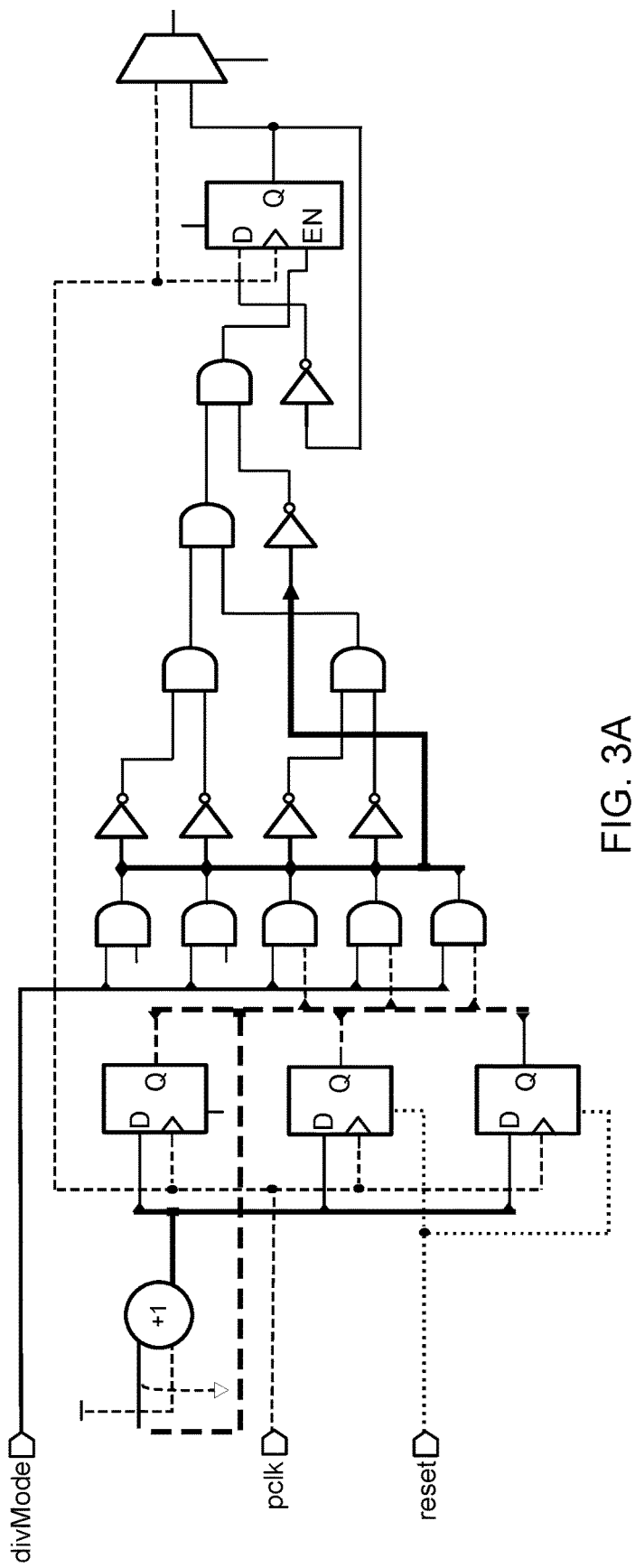
FIG. 3A is a view of a hardware description of another clock network.
Figure 3B:
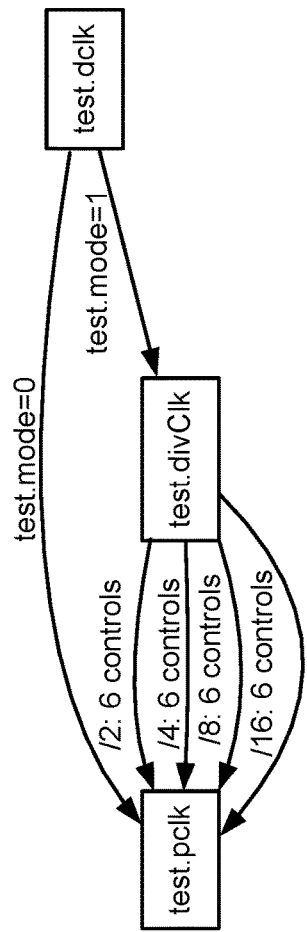
FIG. 3B is a graph of the clock dependencies of the clock network of FIG. 3A.

FIGS. 3A and 3B show a different example. Here, FIG. 3A is a view of the original hardware description 110, and FIG. 3B is the corresponding clock dependency graph.

Not all of the steps shown in FIG. 1 must be performed by all embodiments. Some embodiments perform only some of the functions shown above, with other functions performed by other software.

For example, some or all of the structural design analysis 120 may utilize existing techniques, such as clock-path, clock-domain, and control-logic identification. Other techniques from clock-domain and timing-exception verification may also be used. The structural analysis 120 need not exactly identify the precise clock network logic. Some small but sufficient over-approximation is good enough. In one approach, the tool identifies a structural boundary of the clock generation logic. Preferably, the inputs are primary clocks and controls (configuration signals) and the outputs include derived clocks.

An EDA tool then infers 130 values for the configuration signals for which the derived clocks show valid waveforms. The results of the analysis described above may be used for visualization, verification and/or generation of clocks and clock relations. The analysis may be used to assist a designer, verification engineer, or chip integrator to better design, develop, verify and/or debug issues in their design. The analysis can be applied to a raw design description or can take existing, complete or incomplete, clocks and clock relations to further identify functional components in the clock network, verify existing clocks and clock relations if provided by the user, and generate clocks and clock relations.

Various embodiments may not only benefit designers and verification engineers as an independent tool, but can also provide the following benefits for users of other EDA tools:

Provide clock insight that can help better design implementation in emulators (e.g., Synopsys Zebu)

Provide abstraction mechanism that can speed up simulation (e.g., Synopsys VCS)

Assist clock and clock mode verification and generation as follows:

Help in understanding clock network architecture.

Help document clock network architecture for designs not well known to the designer (e.g., legacy designs where the original designer is not available).

Verify user-defined clock attributes, such as in Synopsys Design Constraint (SDC) format.

Generate clock constraints in SDC (or other) formats which can be used to drive verification and implementation tools.

FIGS. 4A-4C illustrate an example of the formal analysis process 130 of FIG. 1. FIG. 4A is a view of a hardware description of the clock network to be analyzed. This clock network includes primary clocks CLK1 and CLK2, and configuration signals CFG, SEL and EN. There are three derived clocks: clkdiv, clksel and clkgate. clkdiv is the result of a clock shaping function (configurable clock division), clksel is the result of a clock selection function, and clkgate is the result of a clock gating function.

In one example, the parametric liveness property checking proceeds as follows. The parameters (configuration signals) are constrained to be constant by the following:

$$\text{always (CFG==next CFG)}$$

$$\text{always (SEL==next SEL)}$$

$$\text{always (EN==next EN)} \quad (1)$$

Each of these forces the next value of each configuration signal to be the same as the current value, so they are constant over time. This is one way of defining a static clock mode, but not the only way.

Now consider the derived clock clkgate. The definition of a valid clock behavior for clkgate may be expressed as $$\text{always eventually \{!clkgate; clkgate\}} \quad (2)$$

This means that clkgate is perpetually toggling values (possibly after some initialization phase). The property is negated and the dual problem is considered. The assertion check is inverted as $$\text{eventually always \{clkgate==next clkgate\}} \quad (3)$$

This means that clkgate is constant. A counter-example means that clkgate is toggling and indicates a valid clock mode.

Formal analysis is run and identifies counter-examples, which correspond to valid clock modes. In FIG. 4B, the first counter-example is SEL=0,EN=1. In this valid clock mode, clkgate is CLK1. Formal verification is run again, but with an additional constraint that forces a different counter-example. The second counter-example is CFG=00,SEL=1, EN=1. In this valid clock mode, clkgate is CLK2 divided-by-2. This continues until all valid clock modes are discovered, as shown in FIG. 4B.

Similar analysis may be applied to intermediate clocks clkdiv and clksel, and the results can be used to construct the abstracted functional view shown in FIG. 4C. Note in this view, the only components shown are components related to clocking. The D flip-flop and inverter feedback in the lefthand dashed block of FIG. 4A are reduced to a configurable divide-by block in FIG. 4C. The multiplexer in the middle dashed block of FIG. 4A is represented by a clock selection block in FIG. 4C. The circuitry in the righthand dashed block of FIG. 4A is replaced by an AND clock gating circuit in FIG. 4C. FIG. 4C provides an easier-to-understand view of the clock network.

Figure 5:
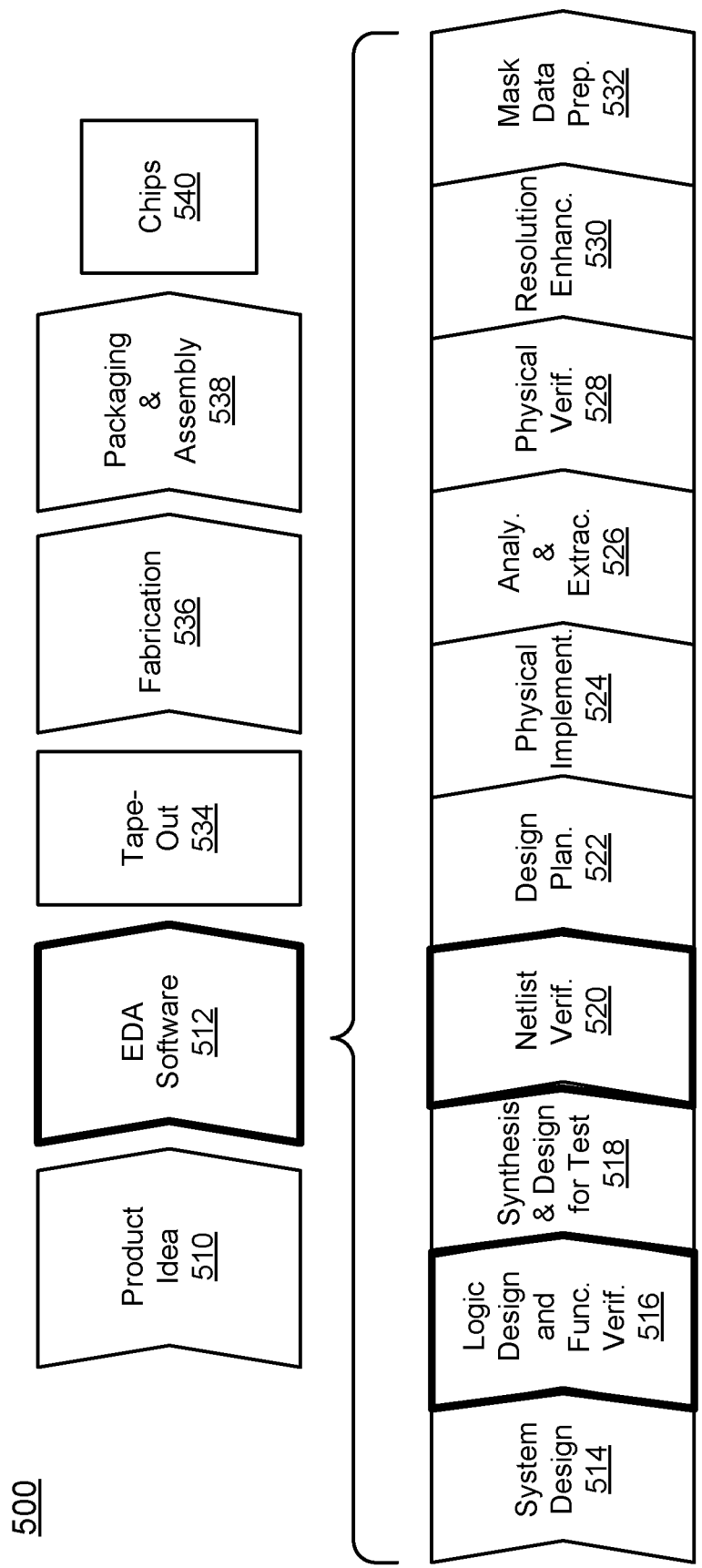
FIG. 5 is a flow diagram illustrating various operations in the design and fabrication of an integrated circuit.

FIG. 5 illustrates various processes performed in the design and fabrication of an integrated circuit using software tools with a computer to transform data and instructions that represent the integrated circuit. The processes shown above may be used in the process of FIG. 5. Specifically, some embodiments of the present disclosure can be used in EDA software 512 as a part of logic design and functional verification 516 or as part of netlist verification 520. These processes start with the generation of a product idea 510 with information supplied by a designer and is realized during a design process that uses EDA software tools 512, which may also be signified herein as EDA software, as a design tool or a verification tool. When the design is finalized, it can be taped-out 534. After tape-out, a semiconductor die is fabricated 536 and packaging and assembly processes 538 are performed, which result in the finished integrated circuit 540 which may also be signified herein as a circuit, device, component, chip or SoC (system on chip).

Note that the design process that uses EDA software tools 512 includes operations 514-532, which are described below. This design flow description is for illustration purposes only and is not meant to limit the present disclosure. For example, an actual integrated circuit design may require a designer to perform the design operations in a different sequence than the sequence described herein.

During system design 514, a designer describes the functionality to be manufactured. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products.

Then, during logic design and functional verification 516, VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: Spyglass, VC Static, VC Formal, VCS, Vera, Designware, Magellan, Formality, ESP and Leda products.

Next, during synthesis and design for test 518, VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification 520, the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

Furthermore, during design planning 522, an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation 524, the placement positioning of circuit elements such as transistors or capacitors and routing connection of the same by a plurality of conductors occurs. Exemplary EDA software products from Synopsys, Inc. of Mountain View, Calif. that can be used at this stage include: the Astro and IC Compiler products.

Then, during analysis and extraction 526, the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification 528, the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement 530, geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation 532, the 'tape-out' data for production of masks to produce finished integrated circuits is provided. Exemplary EDA software products from Synopsys, Inc. of Mountain View, Calif. that can be used at this stage include the Cats. family of products.

For all of the above mentioned integrated circuit design tools, similar tools from other EDA vendors, such as Cadence and Mentor Graphics, can be used as an alternative. Additionally, similarly non-commercial tools available from universities can be used.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Figure 6:
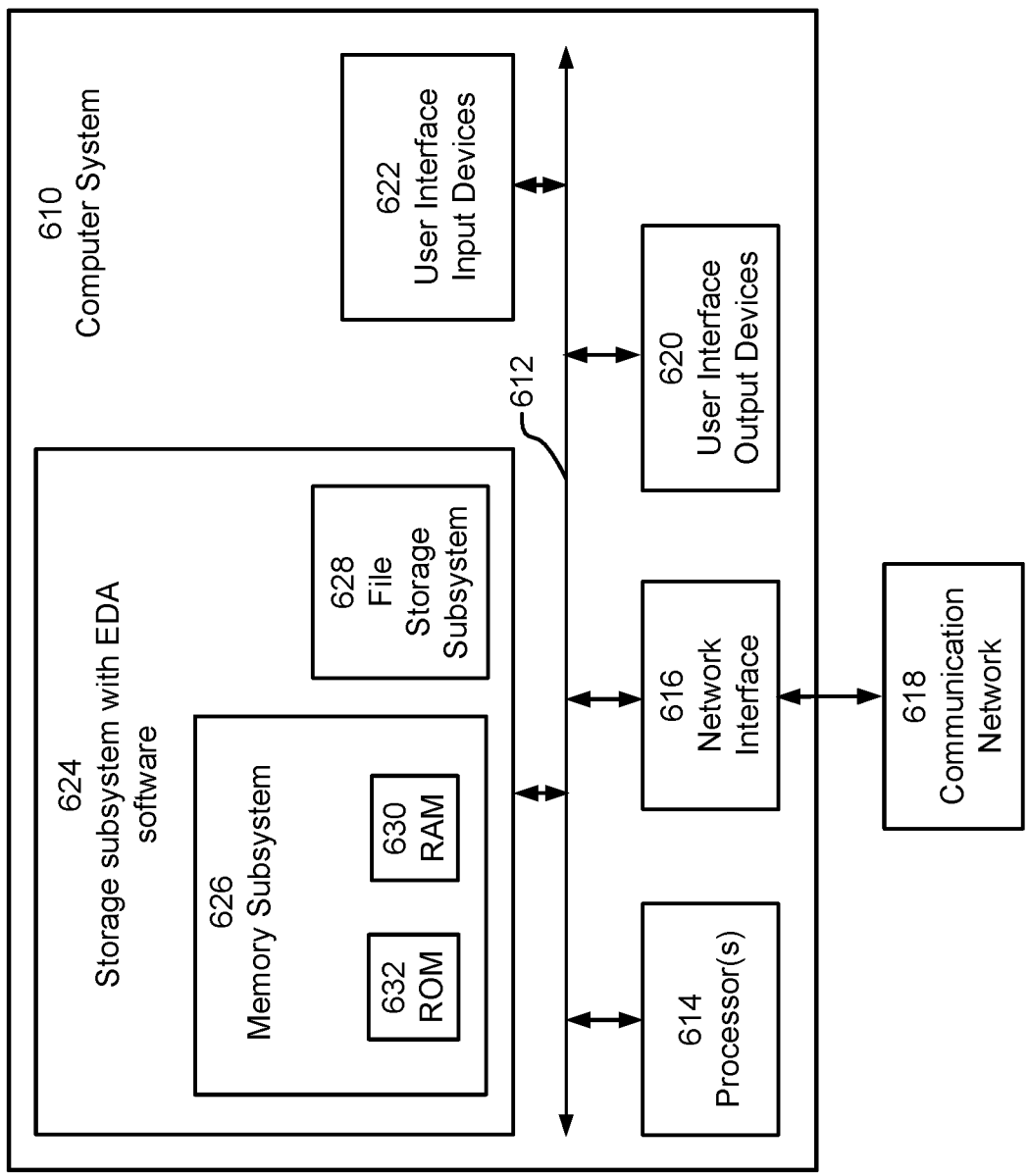
FIG. 6 is a block diagram of one embodiment of a computer system that may be used with the present invention.

FIG. 6 is a block diagram of one embodiment of a computer system 610 that may be used with the present invention. The computer system 610 typically includes at least one computer or processor 614 which communicates with a number of peripheral devices via bus subsystem 612. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms "processor" and "computer" are further defined below. These peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610.

The computer system may be a server computer, a client computer, a workstation, a mainframe, a personal computer (PC), a tablet PC, a rack-mounted "blade" or any data processing machine capable of executing instructions (sequential or otherwise) that specify actions to be taken by that machine.

The computer system typically includes an operating system, such as Microsoft's Windows, Sun Microsystems's Solaris, Apple Computer's MacOs, Linux or Unix. The computer system also typically can include a Basic Input/Output System (BIOS) and processor firmware. The operating system, BIOS and firmware are used by the processor to control subsystems and interfaces connected to the processor. Typical processors compatible with these operating systems include the Pentium and Itanium from Intel, the Opteron and Athlon from Advanced Micro Devices, and the ARM processor from ARM Holdings.

Innovations, embodiments and/or examples of the claimed inventions are neither limited to conventional computer applications nor the programmable apparatus that run them. For example, the innovations, embodiments and/or examples of what is claimed can include an optical computer, quantum computer, analog computer, or the like. The computer system may be a multi-processor or multi-core system and may use or be implemented in a distributed or remote system. The term "processor" here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions to perform any one or more of the operations discussed herein. Due to the ever-changing nature of computers and networks, the description of computer system 610 depicted in FIG. 6 is intended only as one example for purposes of illustrating the preferred embodiments. Many other configurations of computer system 610 are possible having more or less components than the computer system depicted in FIG. 6.

Network interface subsystem 616 provides an interface to outside networks, including an interface to communication network 618, and is coupled via communication network 618 to corresponding interface devices in other computer systems or machines. Communication network 618 may comprise many interconnected computer systems, machines and communication links. These communication links may be wireline links, optical links, wireless links, or any other devices for communication of information. Communication network 618 can be any suitable computer network, for example a wide area network such as the Internet, and/or a local area network such as Ethernet. The communication network can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

User interface input devices 622 may include an alpha-numeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into computer system 610 or onto communication network 618. User interface input devices typically allow a user to select objects, icons, text and the like that appear on some types of user interface output devices, for example, a display subsystem.

User interface output devices 620 may include a display subsystem, a printer, or non-visual displays such as audio output devices. The display subsystem may include a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 610 to the user or to another machine or computer system.

Memory subsystem 626 typically includes a number of memories including a main random-access memory (RAM) 630 (or other volatile storage device) for storage of instructions and data during program execution and a read only memory (ROM) 632 in which fixed instructions are stored. File storage subsystem 628 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 628.

Bus subsystem 612 provides a device for letting the various components and subsystems of computer system 610 communicate with each other as intended. Although bus subsystem 612 is shown schematically as a single bus, alternative embodiments of the bus subsystem may use multiple busses. For example, RAM-based main memory can communicate directly with file storage systems using Direct Memory Access (DMA) systems.

As used herein, the term "module" signifies a tangible data and information processing device, that typically is limited in size and/or complexity. For example, the term "module" can signify one or more methods or procedures that can transform data and information. The term "module" can also signify a combination of one or more methods and procedures in a computer program. The term "module" can also signify a small network of digital logic devices, in which interconnections of the logic devices give structure to the network. Methods and procedures comprising a module, specified in a specialized language, such as System C, can be used to generate a specification for a network of digital logic devices that process data and information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by Xilink or Inters Altera), Random Access Memories (RAMs) or microprocessors. A module is configured to process data and information, typically using a sequence transformations (also referred to as "operations") applied to the data and information (or in the case of ROMs and RAMS, transforming data and information by using the input information as an address for memory that stores output data and information), to perform aspects of the present innovations, embodiments and/or examples of the invention.

Modules that are temporarily configured need not be configured at any one instance in time. For example, a processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a process comprising a sequence or set of operations or instructions that a module can use to transform data and information to achieve a result. A module can comprise one or more algorithms. As used herein, the term "thread" refers to a sequence of instructions that can comprise a subset of the instructions of an entire process or algorithm. A process or algorithm can be partitioned into multiple threads that can be executed in parallel.

As used herein, the term "computer" includes at least one information processor that, for example, can perform certain operations such as (but not limited to) the AND, OR and NOT logical operations using electronic gates that can comprise transistors, with the addition of memory (for example, memory based on flip-flops using the NOT-AND or NOT-OR operation). Such a processor is said to be Turing-complete or computationally universal. A computer, whether or not it is a digital computer, typically comprises many modules.

As used herein, the term "software" or "program" signifies one or more algorithms and data structures that configure a processor for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of data and instructions that configure the processor to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from a data and information storage device. The computer typically has a device for reading storage media that is used to transport the software, or has an interface device that receives the software over a network.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method implemented on a computer system, the computer system executing instructions to effect a method for extracting valid clock modes for a clock network from a hardware description of the clock network, the method comprising:
    accessing a hardware description of the clock network, wherein the clock network includes primary clocks and configuration signals as inputs, the clock network includes derived clocks within the clock network, and the derived clocks are configurable for different clock modes according to the values of the configuration signals; and
    applying a parametric liveness property checking to the derived clocks where the configuration signals are parameters for the parametric liveness property checking, the parametric liveness property checking outputting which values of the configuration signals result in valid clock modes for the derived clocks.

2. The computer-implemented method of claim 1 further comprising:
    based on the parametric liveness property checking, determining clock attributes of the derived clocks for the valid clock modes.

3. The computer-implemented method of claim 2 wherein the determined clock attributes include at least one of: a clock division or multiplication, a clock phase, and a clock offset.

4. The computer-implemented method of claim 2 further comprising:
    verifying the valid clock modes output by the parametric liveness property checking against valid clock modes that are specified for the derived clocks.

5. The computer-implemented method of claim 2 further comprising:
verifying the clock attributes determined based on the parametric liveness property checking against clock attributes that are specified for the derived clocks.

6. The computer-implemented method of claim 2 further comprising:
generating a data structure of the valid clock modes output by the parametric liveness property checking.

7. The computer-implemented method of claim 2 further comprising:
generating a data structure of the clock attributes determined based on the parametric liveness property checking.

8. The computer-implemented method of claim 1 further comprising:
based on relations between the primary clocks and the derived clocks, determining functional clocking components within the clock network.

9. The computer-implemented method of claim 8 wherein the determined functional clocking components are selected from a group consisting of: clock selection components, clock blending components, clock gating components and clock shaping components.

10. The computer-implemented method of claim 9 further comprising:
presenting an abstracted functional view of the clock network based on the primary clocks, the derived clocks and the functional clocking components.

11. The computer-implemented method of claim 8 wherein the determined functional clocking components are associated with corresponding components in the hardware description of the clock network.

12. The computer-implemented method of claim 1 wherein applying the parametric liveness property checking comprises using predefined monitor automata to encode different types of derived clocks, and the predefined monitor automata determine the type of derived clock for the valid clock modes.

13. The computer-implemented method of claim 12 wherein the predefined monitor automata include monitor automata for at least one of: clock dividers with a specific dividing factor, clock dividers with any dividing factor, clock multipliers with a specific multiplying factor, clock multipliers with any multiplying factor, multiplexers, glitch-free multiplexers, and clock gating circuits.

14. The computer-implemented method of claim 12 wherein the predefined monitor automata are hierarchically defined.

15. The computer-implemented method of claim 1 wherein applying a parametric liveness property checking to the derived clocks comprises:
applying safety property checking to the derived clocks, wherein the liveness property checking can be inferred from the safety property checking.

16. The computer-implemented method of claim 1 further comprising:
accessing a hardware description of a digital circuit that includes the clock network; and
identifying the clock network within the digital circuit.

17. The computer-implemented method of claim 16 wherein identifying the clock network within the digital circuit comprises:
identifying clock paths from the primary clocks through the digital circuit; and
identifying control paths from the configuration signals to control the clock paths.

18. The computer-implemented method of claim 1 wherein the hardware description of the clock network is an RTL-level description of the clock network or a gate-level description of the clock network.

19. A system for extracting valid clock modes for a clock network from a hardware description of a digital circuit containing the clock network, the system comprising:
a first EDA tool that:
accesses a hardware description of a digital circuit that includes the clock network; and
identifies the clock network within the digital circuit; and
a second EDA tool that:
receives the identification of the clock network from the first EDA tool;
accesses the hardware description of the clock network, wherein the clock network includes primary clocks and configuration signals as inputs, the clock network includes derived clocks within the clock network, and the derived clocks are configurable for different clock modes according to the values of the configuration signals; and
applies a parametric liveness property checking to the derived clocks where the configuration signals are parameters for the parametric liveness property checking, the parametric liveness property checking outputting which values of the configuration signals result in valid clock modes for the derived clocks.

20. A non-transitory computer-readable storage medium storing executable computer program instructions for extracting valid clock modes for a clock network from a hardware description of the clock network, the instructions executable by a processor and causing the processor to perform a method comprising:
accessing a hardware description of the clock network, wherein the clock network includes primary clocks and configuration signals as inputs, the clock network includes derived clocks within the clock network, and the derived clocks are configurable for different clock modes according to the values of the configuration signals; and
applying a parametric liveness property checking to the derived clocks where the configuration signals are parameters for the parametric liveness property checking, the parametric liveness property checking outputting which values of the configuration signals result in valid clock modes for the derived clocks.

* * * * *